(12) United States Patent
Hsieh

(10) Patent No.: US 6,923,416 B1
(45) Date of Patent: Aug. 2, 2005

(54) ADJUSTABLE DEVICE WITH A MUSICAL KEYBOARD STAND

(76) Inventor: Wu-Hong Hsieh, No. 162, Chung Shan 2nd Rd., Lu Chou City, Taipei Hsien (TW)

( * ) Notice: Subject to any disclaimer, the term of this patent is extended or adjusted under 35 U.S.C. 154(b) by 0 days.

(21) Appl. No.: 10/773,241

(22) Filed: Feb. 9, 2004

(51) Int. Cl.[7] ............................................. F16M 11/38
(52) U.S. Cl. ........................ 248/431; 248/171; 108/118
(58) Field of Search ................................. 248/164, 431, 248/432, 166, 168, 169, 170, 171; 108/118, 117, 133, 120; 403/61, 85, 91, 93, 96

(56) References Cited

U.S. PATENT DOCUMENTS

| | | | | |
|---|---|---|---|---|
| 2,927,719 A | * | 3/1960 | Wareham | 224/550 |
| 3,087,701 A | * | 4/1963 | Wallace | 248/166 |
| 4,645,371 A | * | 2/1987 | Wang | 403/93 |
| 4,666,328 A | * | 5/1987 | Ryu | 403/92 |
| 4,890,950 A | * | 1/1990 | Yoo | 403/96 |
| 4,917,341 A | * | 4/1990 | Pirchio | 248/164 |
| 5,022,118 A | * | 6/1991 | Wan-Li | 16/327 |
| 5,026,198 A | * | 6/1991 | Lin | 403/27 |
| 5,199,930 A | * | 4/1993 | Weber | 482/17 |
| 5,205,526 A | * | 4/1993 | Deutsch | 248/449 |
| 5,353,892 A | * | 10/1994 | Lu | 182/163 |
| 5,358,204 A | * | 10/1994 | Terada | 248/164 |
| 5,467,953 A | * | 11/1995 | Malizia | 248/166 |
| 5,620,272 A | * | 4/1997 | Sheng | 403/96 |
| 5,816,545 A | * | 10/1998 | Malizia | 248/164 |
| 5,857,649 A | * | 1/1999 | Eason | 248/164 |
| 5,984,245 A | * | 11/1999 | Hsu | 248/164 |
| 6,343,406 B1 | * | 2/2002 | Yeh | 16/328 |
| 6,688,797 B2 | * | 2/2004 | Park et al. | 403/93 |
| 6,789,848 B2 | * | 9/2004 | Rauschenberger et al. | 297/369 |

FOREIGN PATENT DOCUMENTS

DE  4431179 A1 * 1/1995 ............. E06C/7/50

* cited by examiner

Primary Examiner—Leslie A. Braun
Assistant Examiner—A. Joseph Wujciak
(74) Attorney, Agent, or Firm—Rosenberg, Klein & Lee

(57) ABSTRACT

An adjustable device includes a first disk mounted on a side of the first stand to have a finger hole to movably receive therein a finger, a second disk mounted on a side of the second stand to combine the first disk and having multiple adjusting holes defined in a peripheral edge of the second disk to allow an extension of the finger and a sliding plate sandwiched between the first disk and the second disk and movable between a first position where a free end of the finger is detachably engaged with a free end of the sliding plate and a second position where the free end of the finger is separated from the sliding plate and is received in a very last adjusting hole of the second disk, in which a relative angle between the first stand and the second stand is maximum.

8 Claims, 10 Drawing Sheets

ADJUSTABLE DEVICE WITH A MUSICAL KEYBOARD STAND

BACKGROUND OF THE INVENTION

1. Field of the Invention

The present invention relates to an adjustable device, and more particularly to the adjustable device in combination with a stand to support a musical keyboard thereon.

2. Description of Related Art

With reference to FIGS. 7 and 8, a conventional adjustable device is mounted between a first stand (30) and a second stand (40) to allow the musical keyboard stand to adjust its height so that the operator is able to freely adjust the height of the keyboard stand (not shown) according to the operator's height.

The adjustable device includes a first disk (31) securely mounted on a side of the first stand (30), a second disk (41) securely mounted on a side of the second stand (40) and having multiple adjusting holes (411) defined through a peripheral edge of the second stand (40) and an adjusting rod (32) extending through the first stand (30), the first disk (31) and into the second disk (41). A spring (33) is mounted around the adjusting rod (32) and abutted between two opposite inner faces of the first stand (30).

When the adjustable device is in application to adjust the relative position of the first stand (30) to the second stand (40), the user is able to pull a knob (34) formed on a free end of the adjusting rod (32) extending out of the first stand (30) to allow the first stand (30) to be freely pivoted relative to the second stand (40) so as to adjust the height of the musical keyboard stand. When the height of the musical keyboard stand is determined, the operator is able to let go the knob (34) to allow the free end of the adjusting rod (32) to extend into one of the adjusting holes (411) of the second disk (41). Thereafter, the relative position between the first stand (30) and the second disk (40) is fixed. Although the adjustment of the musical keyboard stand is able to be accomplished via the conventional adjustable device, the operator will have to hold either one of the first or the second stand (30,40) with one hand and the knob (34) with the other hand, which is quite inconvenient to the operator.

In order obviate the foregoing shortcoming, a different adjustable device is introduced to the market.

With reference to FIGS. 9 and 10, a second conventional adjustable device is shown and includes a first disk securely mounted on a first stand (both the first disk and the first stand are not shown for brevity) and a second disk (51) mounted on the second stand (50).

The first disk has a blocking head (53) pivotally mounted on a side of the first disk and a resilient element (54), i.e. a spring, having a first end securely engaged with a side face of the first disk and a second end abutting a side face of the blocking head (53) to urge a free end of the blocking head (53) to pivot toward the center of the first disk.

The second disk (51) has a notched disk (52) securely mounted on a center of the second disk and having a first stop (521) and a second stop (522) spatially formed on a side face of the notched disk (52) and an abutting bar (55) pivotally mounted on the notched disk (52) and having a free end engaging with a side face of the blocking head (53).

It is noted that when the musical keyboard stand is folded, the blocking head (53) abuts the free end of the abutting bar (55) which is stopped by the first stop (521). When the operator is adjusting the first stand and the second stand (50) by enlarging the relative angle between the first stand and the second stand (50), due to the abutting force from the resilient element (54), the blocking head (53) is forced by the resilient element (54) to urge the free end of the abutting bar (55). Therefore, when the relative angle between the first stand and the second stand increases, the abutting bar (55) moves along the blocking head (53) until the abutting bar (55) is stopped by the second stop (522). Then after the blocking head (53) separates the abutting bar (55), the free end of the blocking head (53) falls into the positioning tooth (523) of the notched disk (52) where the relative angle between the first stand and the second stand is maximum. The free end of the blocking head (53) is configured in such a way that the free end of the blocking head (53) is easy to fall into and away from any one of the teeth of the notched disk (52). Therefore, the operator is able to step by step adjusts the relative angle between the first stand and the second stand (50) until the abutting bar (55) is stopped by the first stop (521) where continuous moving the first stand relative to the second stand (50) allows the free end of the abutting bar (55) to be abutted by the blocking head (53) again. The single-handed operating mechanism does solve the inconvenience from the conventional adjustable device to quickly and conveniently adjust the relative between the two stand. However, the teeth is becoming worn as the time of using the adjustable device lasts and the resilience of the resilient element (54) becomes weaker and weaker due to fatigue. The conventional adjustable device still can not fulfill the requirements.

To overcome the shortcomings, the present invention tends to provide an improved adjustable device to mitigate the aforementioned problems.

SUMMARY OF THE INVENTION

The primary objective of the present invention is to provide an improved adjustable device to allow the user to easily and conveniently adjust the angle between the two stands.

Other objects, advantages and novel features of the invention will become more apparent from the following detailed description when taken in conjunction with the accompanying drawings.

DETAILED DESCRIPTION OF THE PREFERRED EMBODIMENT

Figure 1:
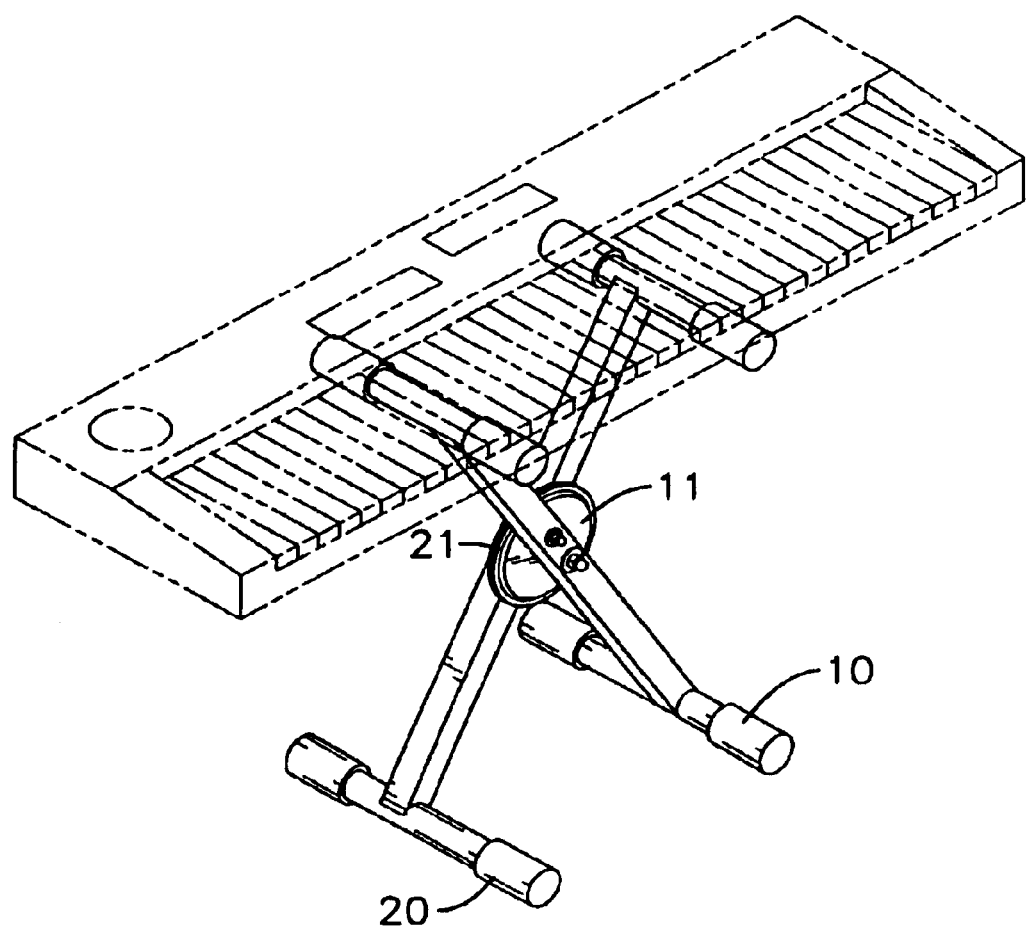
FIG. 1 is an exploded perspective view showing the adjustable device in combination with two stands.

With reference to FIG. 1, the adjustable device in accordance with the present invention is incorporated with a first stand (10) and a second stand (20) pivotally connected to the first stand (10) and includes a first disk (11) securely mounted on a side of the first stand (10) and a second disk (21) securely mounted on a side of the second stand (20).

The adjustable device of the present invention further has a finger (12), a sliding plate (13) and a spring (14) mounted on the finger (12).

The first stand (10) has a first pivot hole (101) and a finger hole (102) corresponding to the finger (12). The finger (12) has a first end on which a slanted face (121) is formed and a second end provided with a threading (122). The sliding plate (13) has a through hole (131) defined to correspond to the first pivot hole (101) of the first stand (10) and a pyramidal head (132) corresponding to the slanted face (121) of the finger (12).

The second disk (21) has a second pivot hole (201) defined to correspond to the through hole (131) of the sliding plate (13), a first boss (211), a second boss (212) spatially aparted from the first boss (211) and a pivot (22) extending through the second stand (20), the second disk (21), the sliding plate (13), the finger (12), the first disk (11) and the first stand (10) to mate with a cap (221). Because the pivot (22) is a threaded bolt, the engagement between the pivot (22) and the cap (221) is able to secure the engagement between the first and the second stand (10,20).

When the adjustable device and the two stands (10,20) are assembled, it is noted that due to the extension of the pivot (22) through the second stand (20), the second disk (21), the sliding plate (13), the finger (12), the first disk (11) and the first stand (10) to mate with a cap (221), the finger (12) is movably received between the first disk (11) and the second disk (21) and the sliding plate (13) is slidably sandwiched between the first disk (11) and the second disk (21).

It is further noted that the second disk (21) has multiple adjusting holes (23,24,25,26,27) defined along a peripheral edge of the second disk (21) to correspond to the free end of the finger (12).

Figure 2:
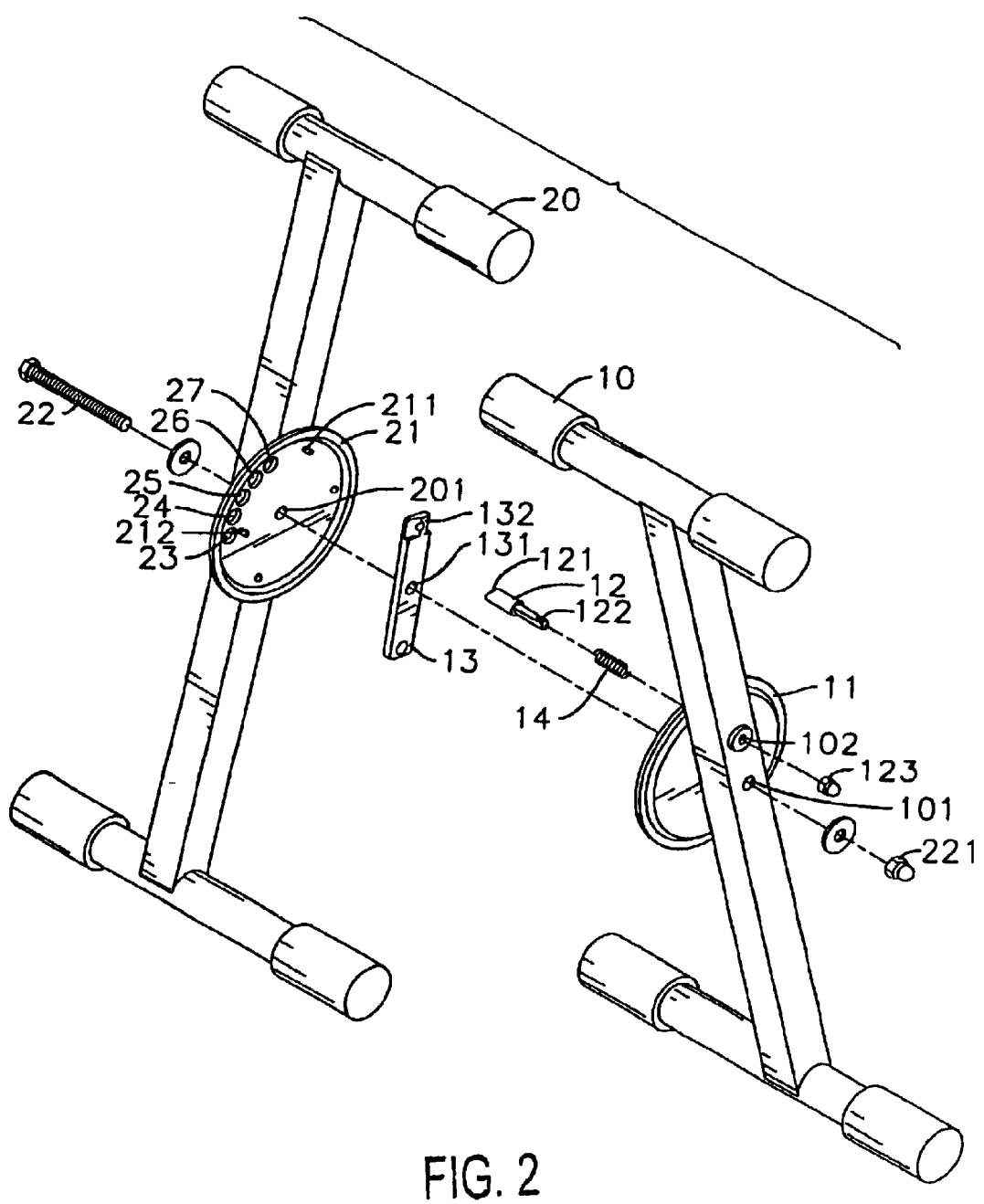
FIG. 2 is a partially cross-sectional view showing the internal relative position of the parts when the two stands are folded.
Figure 3:
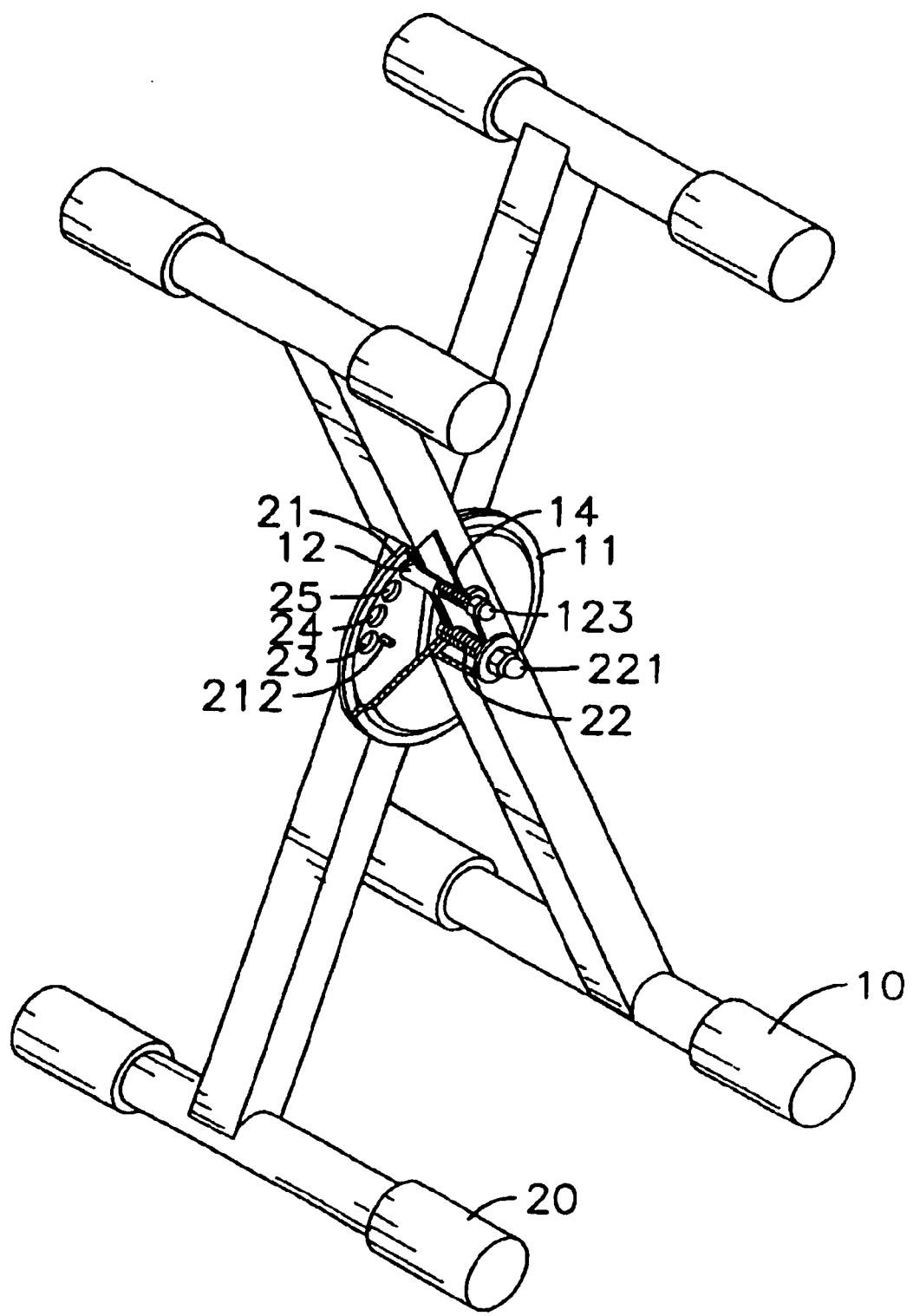
FIG. 3 is a partially cross-sectional view showing the internal relative position of the parts when the two stands are fully extended away from each other.

With reference to FIGS. 2 and 3, it is to be noted that when the first and second stands (10,20) are folded, the free end of the finger (12) is received in the last adjusting hole (27) and when the angle between the first and second stands (10,20) are fully extended, the free end of the finger (12) extends into the first adjusting hole (23).

Figure 4:
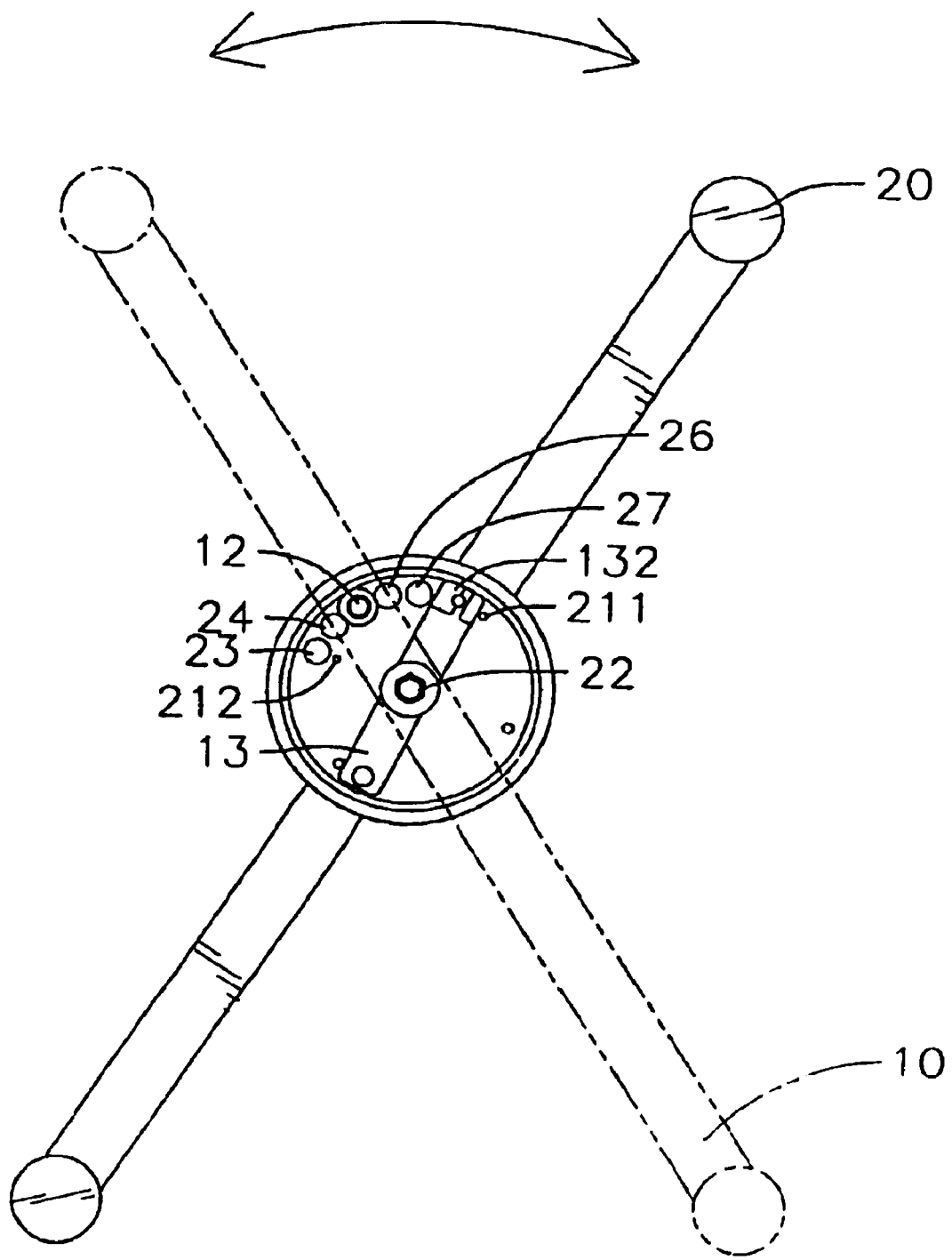
FIG. 4 is a perspective view showing the application of the adjustable device of the present invention.
Figure 5:
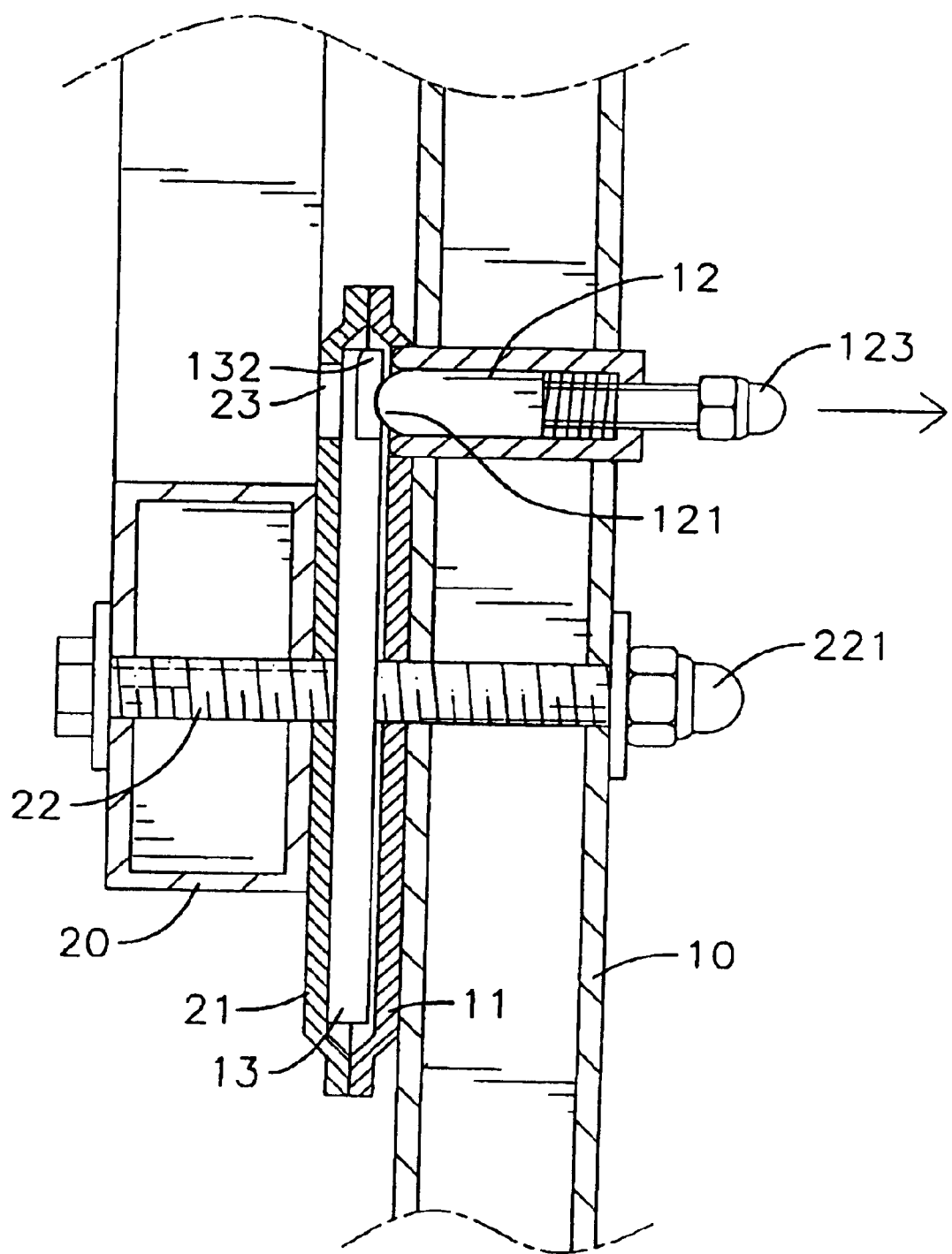
FIG. 5 is a side plan view showing the application of the adjustable device of the present invention.
Figure 6:
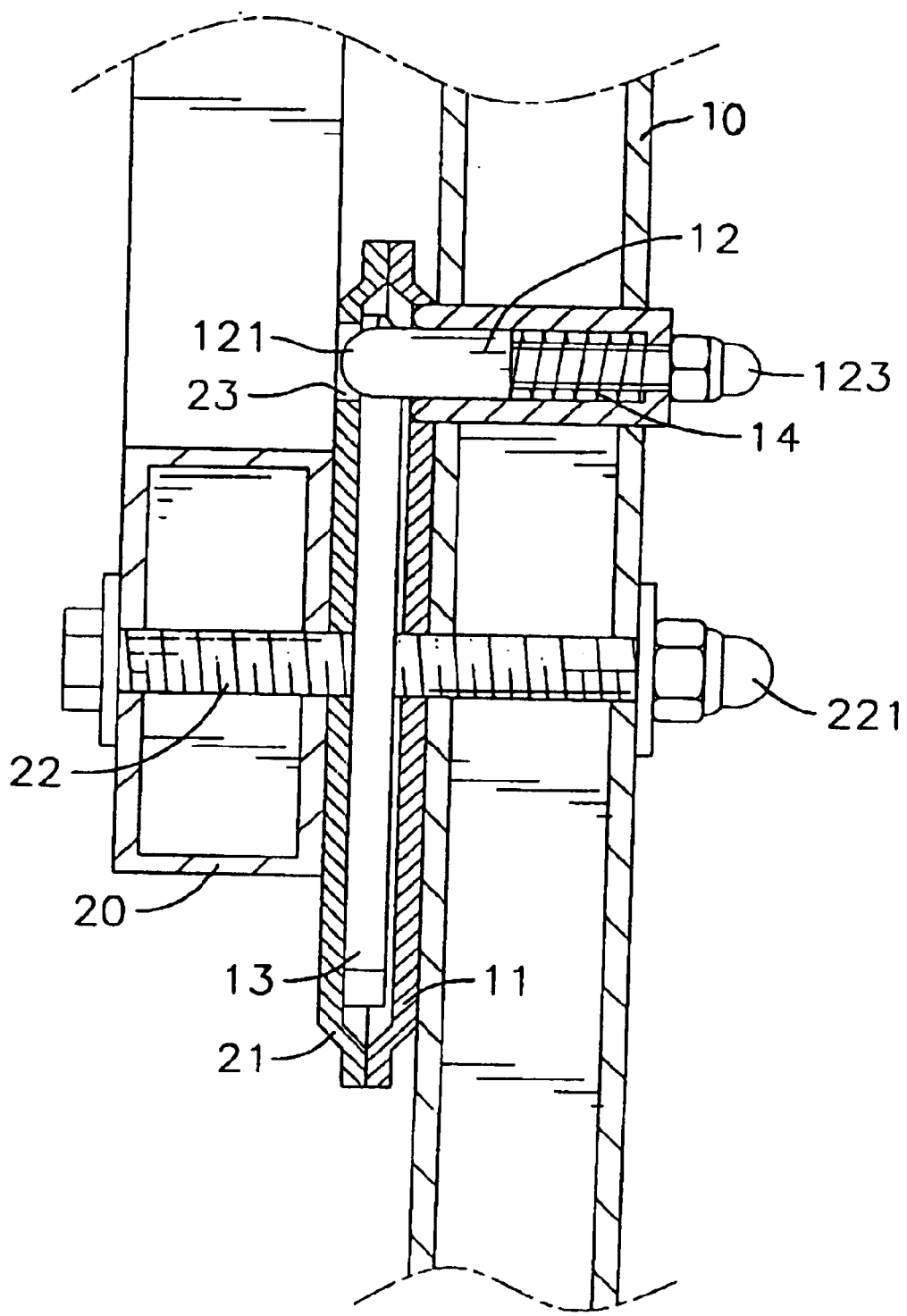
FIG. 6 is a schematic view showing the two stands are adjusted to support thereon a musical keyboard.
Figure 7:
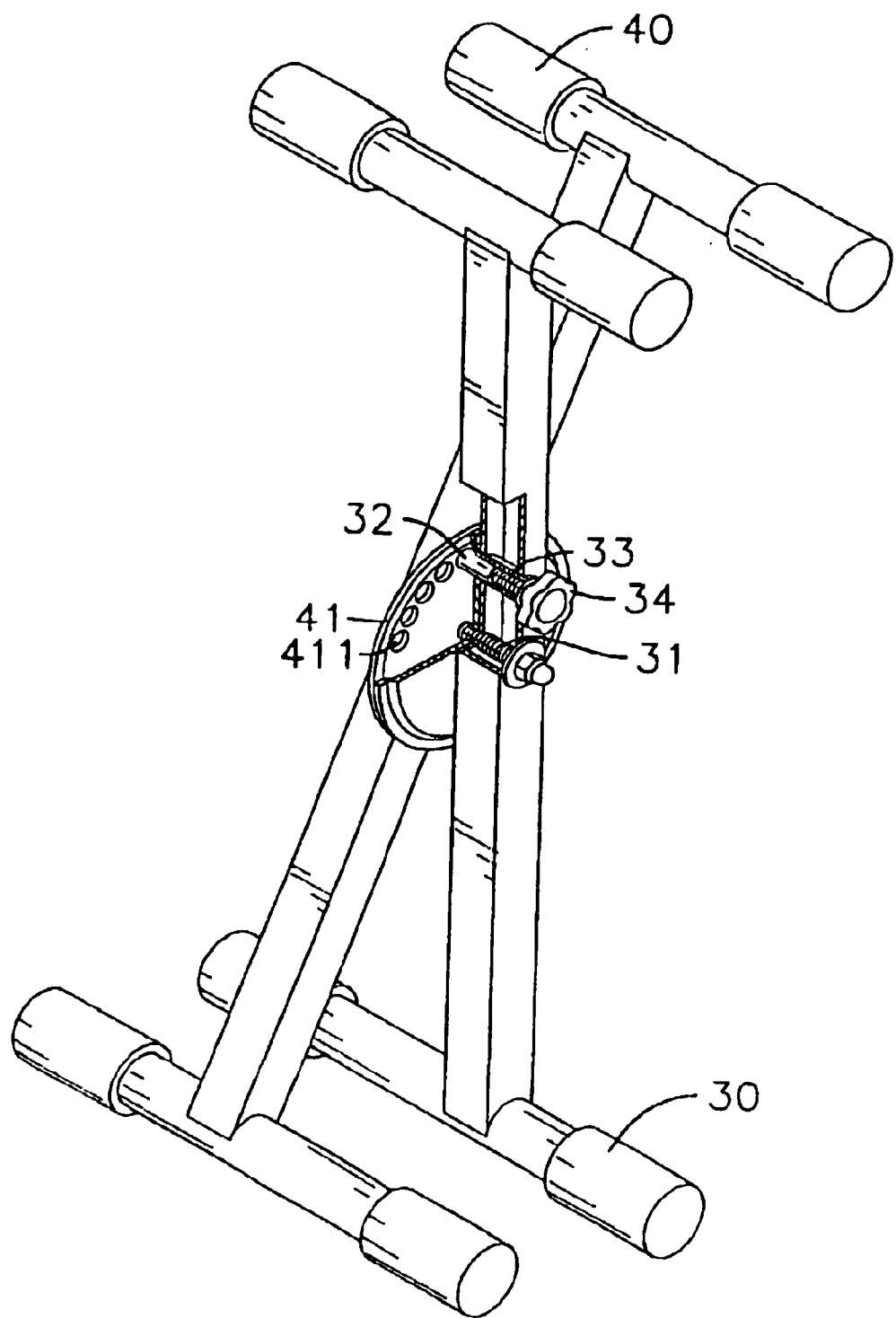
FIG. 7 is a perspective view of a conventional adjustable device for a musical instrument.
Figure 8:
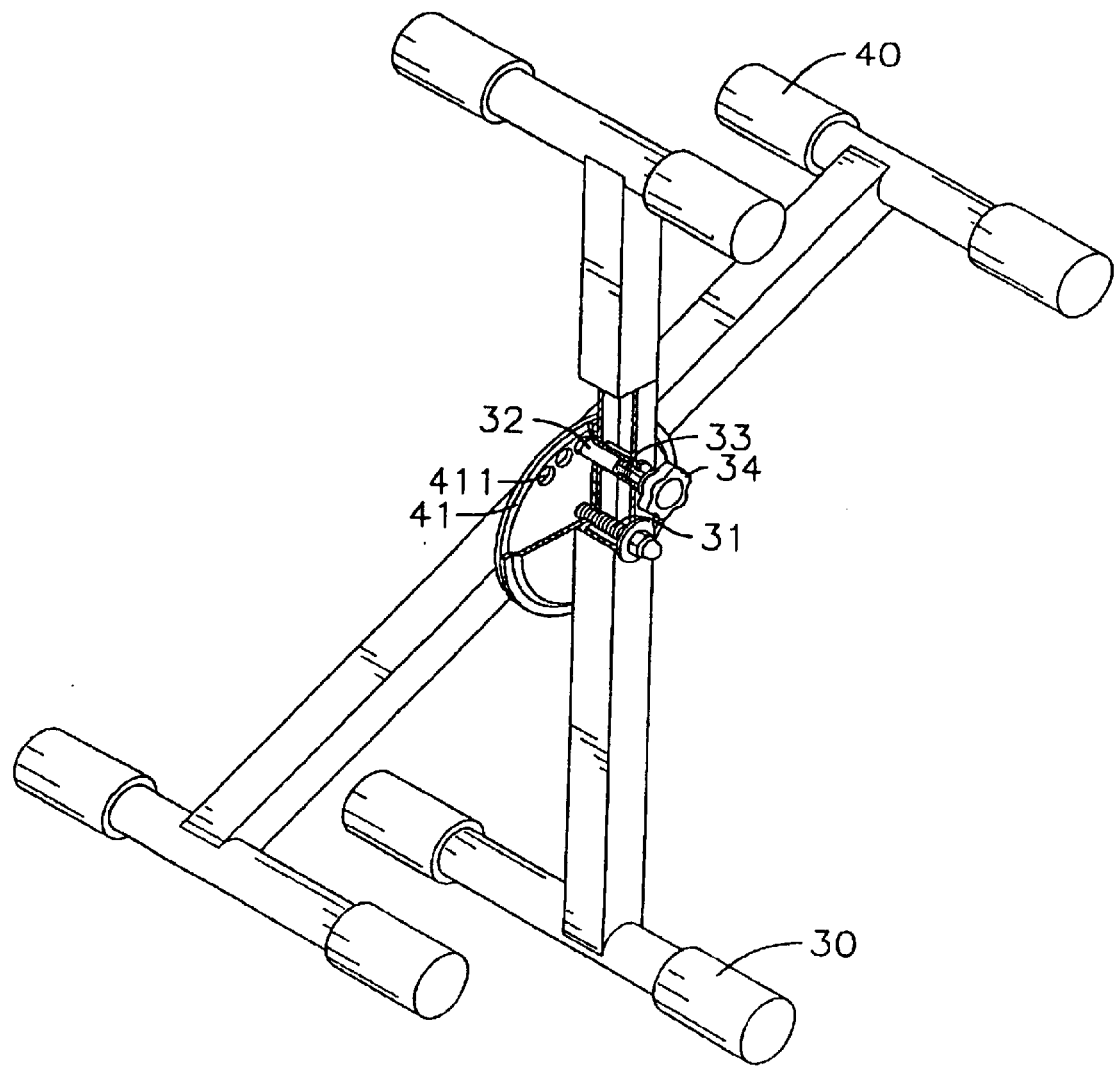
FIG. 8 is a perspective view showing the application of the adjustable device shown in FIG. 7.
Figure 9:
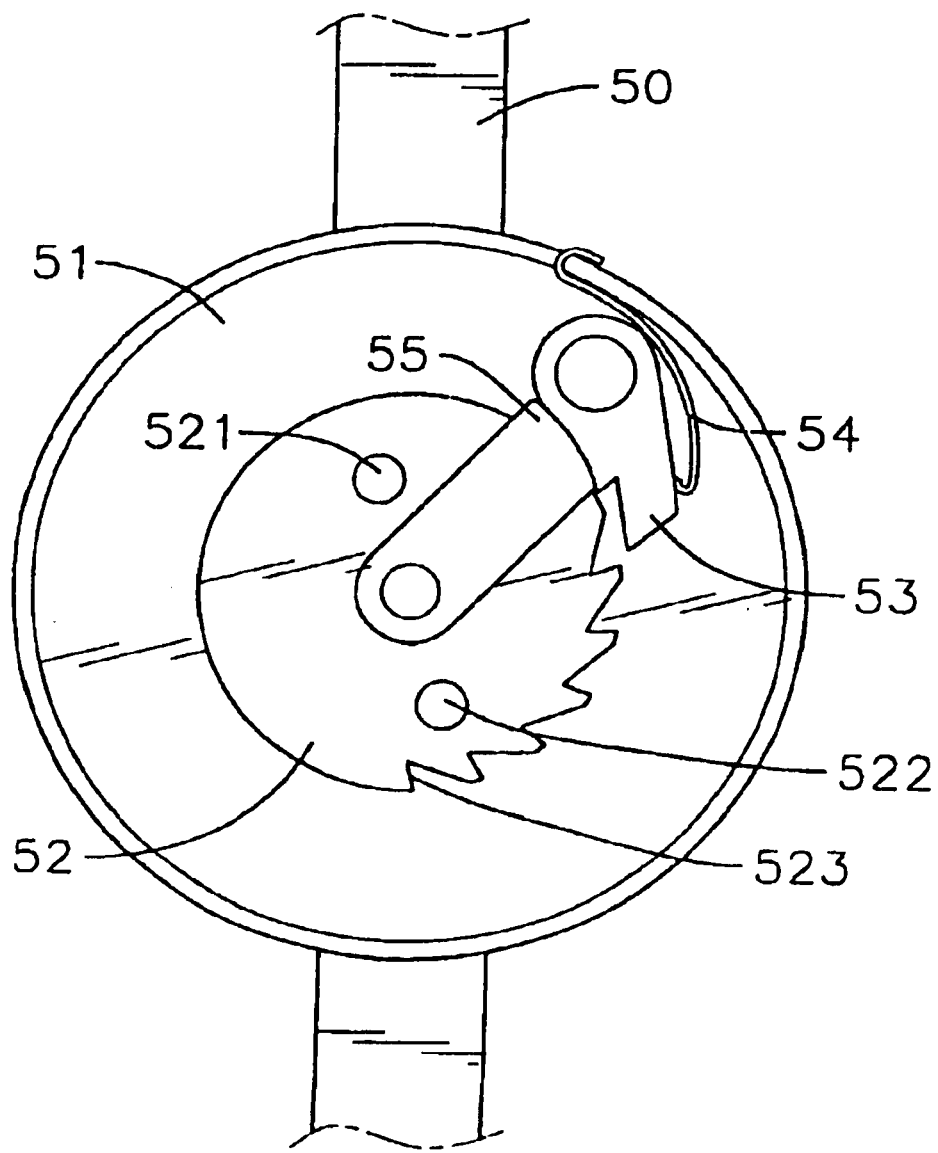
FIG. 9 is a schematic view showing a different conventional adjustable device to adjust the musical stand height.
Figure 10:
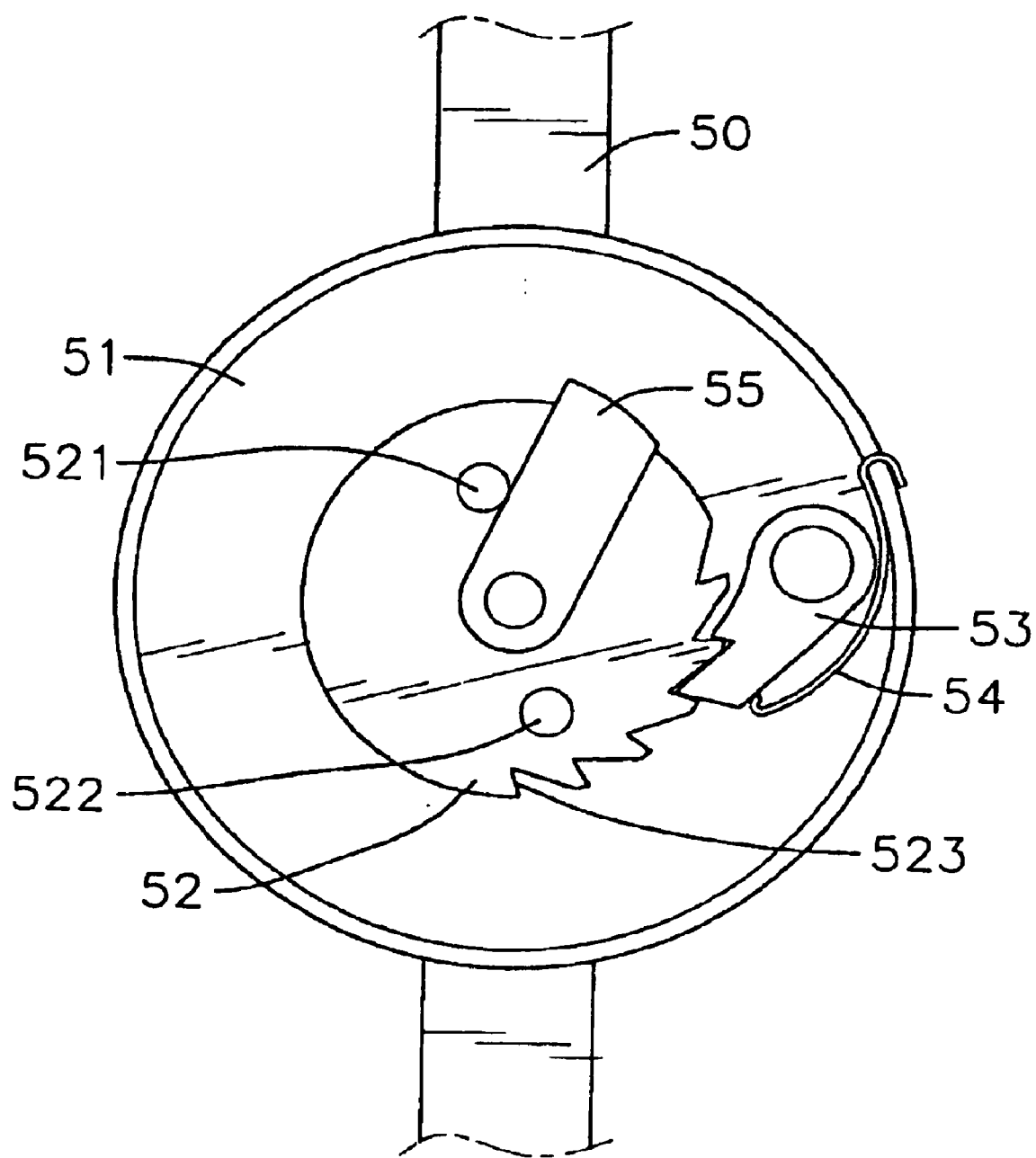
FIG. 10 is a schematic view showing the application of the adjustable device in FIG. 9.

With reference to FIGS. 4, 5 and still using FIGS. 2 and 3 for reference, during adjustment of the relative angle between the first and second stands (10,20), the user first fully stretches the first stand (10) relative to the second stand (20) from the status where the first stand (10) and the second stand (20) are folded. It is noted that when the first and second stands (10,20) are folded, the slanted face (121) engages with a side face of the pyramidal head (132). That is, the free end of the finger (12) is stopped by the sliding plate (13) from extending into any one of the adjusting holes (23,24,25,26,27). As the relative angle between the first and second stands (10,20) increases, the sliding plate (13) is stopped by the second boss (212). Meanwhile, continuous movement of the first stand (10) relative to the second stand (20) allows the free end of the finger (12) to extend into the first adjusting hole (23). As a result of the extension of the free end of the finger (12), the relative angle between the first stand (10) and second stand (20) is fixed, which is shown in FIG. 3.

Because the sliding plate (13) is stopped by the second boss (212), when the user is trying to narrow down the relative angle between the first and second stands (10,20), the retraction of the first stand (10) triggers the sliding movement of the slanted face (121) from one adjusting hole to another (23,24,25,26,27). When the finger (12) is moving backward, the sliding plate (13) is thus forced by the finger (12) to move away from the second boss (212) and toward the first boss (211). Therefore, because of the slanted face (121), the finger (12) is easily extended into any one of the adjusting holes (23,24,25,26,27) to fix the relative position between the first and second stands (10,20).

When the first stand (10) moves toward the second stand (20) to narrow down the relative angle between the first stand (10) and the second stand (20), the sliding plate (13) is eventually stopped by the first boss (211). Accordingly, continuously pivoting the first stand (10) in relation to the second stand (20) allows the slanted face (121) to ride on the pyramidal head (132) to combine the finger (12) and the sliding plate (13), which returns to the situation as shown in FIG. 2.

It is noted that the threading (122) of the finger (12) may extend through the first stand (10) to engage with a nut (123) to ensure the engagement between the finger (12) and the first stand (10) and the spring (14) to be securely mounted around the finger (12).

With the aforementioned arrangement, the user needs not worry about the worn of the teeth as shown in the conventional adjustable device and the inconvenience caused by a different adjustable device.

In summary, the adjustable device allows the user to accurately, conveniently and timely accomplish the adjustment between the first and second stands such that the performer of the musical keyboard is able to easily adjust the stand height to comply with the height of the performer so as to present the best performance.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An adjustable device in combination with a musical keyboard stand, wherein the keyboard stand comprises:
   a first stand having a first pivot hole defined through the first stand;
   a second stand having a second pivot hole defined to correspond to and aligned with the first pivot hole to allow a pivot to extend through the aligned first and second pivot holes to unite the first and second stands;
   the adjustable device comprises:
   a first disk mounted on a side of the first stand to have a finger hole to movably receive therein a finger;
   a second disk mounted on a side of the second stand to combine the first disk and having multiple adjusting holes defined in a peripheral edge of the second disk to allow an extension of the finger; and
   a sliding plate sandwiched between the first disk and the second disk and movable between a first position where a free end of the finger is detachably engaged with a free end of the sliding plate and a second position where the free end of the finger is separated from the sliding plate and is received in a very last adjusting hole of the second disk, in which a relative angle between the first stand and the second stand is maximum.

2. The adjustable device in combination with a musical keyboard stand as claimed in claim 1, wherein the free end of the finger is provided with a slanted face and the free end of the sliding plate is provided with a pyramidal head so that the engagement and separation between the free end of the finger and the free end of the sliding plate is expedited.

3. The adjustable device in combination with a musical keyboard stand as claimed in claim 1, wherein the second disk has a first boss and a second boss spatially aparted from the first boss to respectively stop the movement of the sliding plate.

4. The adjustable device in combination with a musical keyboard stand as claimed in claim 2, wherein the second disk has a first boss and a second boss spatially aparted from the first boss to respectively stop the movement of the sliding plate.

5. The adjustable device in combination with a musical keyboard stand as claimed in claim 1, wherein a spring is mounted around the finger to facilitate the movement of the finger.

6. The adjustable device in combination with a musical keyboard stand as claimed in claim 2, wherein a spring is mounted around the finger to facilitate the movement of the finger.

7. The adjustable device in combination with a musical keyboard stand as claimed in claim 3, wherein a spring is mounted around the finger to facilitate the movement of the finger.

8. The adjustable device in combination with a musical keyboard stand as claimed in claim 4, wherein a spring is mounted around the finger to facilitate the movement of the finger.

\* \* \* \* \*